US009904418B2

(12) United States Patent
Mu et al.

(10) Patent No.: US 9,904,418 B2
(45) Date of Patent: Feb. 27, 2018

(54) TOUCH DISPLAY SCREEN AND TOUCH DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Suzhen Mu, Beijing (CN); Ming Hu, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 17 days.

(21) Appl. No.: 14/344,710

(22) PCT Filed: Jun. 18, 2013

(86) PCT No.: PCT/CN2013/077407
§ 371 (c)(1),
(2) Date: Mar. 13, 2014

(87) PCT Pub. No.: WO2014/153854
PCT Pub. Date: Oct. 2, 2014

(65) Prior Publication Data
US 2015/0301645 A1    Oct. 22, 2015

(30) Foreign Application Priority Data
Mar. 28, 2013  (CN) .......................... 2013 1 0106032

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01)

(58) Field of Classification Search
CPC .................... G06F 3/044; G06F 3/047; G06F 2203/04111–2203/04113
(Continued)

(56) References Cited

U.S. PATENT DOCUMENTS 9,122,358 B2 *  9/2015  Liu ........................ G06F 3/0416
2009/0073336 A1 *  3/2009  Peng ................. G02F 1/136204
                                                        349/40
(Continued)

FOREIGN PATENT DOCUMENTS

CN      102955613 A     3/2012
CN      102955303 A     3/2013
CN      203217513 U     9/2013

OTHER PUBLICATIONS

International Search Report for International Application No. PCT/CN2013/077407, 12pgs.
(Continued)

*Primary Examiner* — Stephen Sherman
(74) *Attorney, Agent, or Firm* — Banner & Witcoff, Ltd.

(57) ABSTRACT

A touch display screen and a touch display device comprising the touch display screen are provided. The touch display screen comprises: an array substrate (10) and a color filter substrate (11) opposite to each other; a group of first electrode lines (12) and a group of second electrode lines (13) provided on the color filter substrate (11), wherein the first electrode lines (12) are insulated from and intersect with the second electrode lines (13); and a group of first ground lines (14) and/or a group of second ground lines (15) provided on the color filter substrate (11), wherein the first ground lines (14) are insulated from and intersect with the second ground lines (15).

19 Claims, 7 Drawing Sheets

(58) Field of Classification Search
USPC .......................................... 345/174; 178/18.06
See application file for complete search history.

(56) References Cited

U.S. PATENT DOCUMENTS

| | | |
|---|---|---|
| 2010/0097334 A1 | 4/2010 | Choi et al. |
| 2011/0032193 A1* | 2/2011 | Szalkowski ............ G06F 3/044 345/173 |
| 2011/0157079 A1* | 6/2011 | Wu ........................ G06F 3/044 345/174 |
| 2012/0075218 A1* | 3/2012 | Lin ....................... G06F 3/0418 345/173 |
| 2012/0086879 A1 | 4/2012 | Yu et al. |
| 2013/0147730 A1* | 6/2013 | Chien ................... G06F 3/0412 345/173 |
| 2014/0049271 A1* | 2/2014 | Trend ................. G01R 27/2605 324/663 |
| 2014/0085250 A1* | 3/2014 | Cok ....................... G06F 3/044 345/174 |
| 2014/0118279 A1 | 5/2014 | Ding et al. |
| 2015/0177571 A1* | 6/2015 | Yoshida ............ G02F 1/134363 349/33 |

OTHER PUBLICATIONS

May 4, 2015—(CN)—First Office Action for Appn 201310106032.5 with Eng Tran.
Sep. 29, 2015—International Preliminary Report on Patentability Appn PCT/CN2013/077407.

* cited by examiner

TOUCH DISPLAY SCREEN AND TOUCH DISPLAY DEVICE

CROSS REFERENCE TO RELATED APPLICATIONS

This application is based on International Application No. PCT/CN2013/077407 filed on Jun. 18, 2013, which claims priority to Chinese National Application No. 201310106032.5 filed on Mar. 28, 2013. The entire contents of each and every foregoing application are incorporated herein by reference.

TECHNICAL FIELD

Embodiments of the invention relate to a touch display screen and a touch display device.

BACKGROUND

At present, most of capacitive touch display screens are of an on-cell form, namely, a touch screen and a display screen are manufactured separately and then the touch screen is attached to the display screen. Such on-cell form has the disadvantages of high manufacture cost, low light transmittance and large thickness. With the development of technology, the touch display screen of an in-cell form has gradually become a new trend in the related art. In the touch display screen of the in-cell form, a drive electrode line and a detection electrode line for achieving the touch function are provided on a substrate of the display screen. Compared with the touch display device of the on-cell form, the touch display device of the in-cell form has the advantages of small thickness, high performance and low cost.

The display screen of an ADS (Advanced Super Dimension Switch, ADS for short) mode is popular in the panel display field at present. In the ADS mode, a multi-dimensional electric field is formed with both an electric field generated at edges of slit electrodes in a same plane and an electric field generated between a slit electrode layer and a plate-like electrode layer, so that liquid crystal molecules at all orientations, which are provided directly above the electrodes or between the slit electrodes in a liquid crystal cell, can be rotated, In this way, the work efficiency of liquid crystal can be enhanced and the light transmittance can be increased. The ADS mode has advantages of high resolution, low power consumption, wide viewing angle, high aperture ratio, low chromatic aberration, free of push Mura, etc.

When the above-mentioned in-cell touch display technology is applied to the display screen of ADS mode, a portion of a slit electrode on an array substrate of the display screen serve as the drive electrode line for achieving the touch function; and the detection electrode line intersecting with the drive electrode line is provided between a base substrate and a black matrix of a color filter substrate of the display device. A drive circuit drives the slit electrode in a time-division manner so that the slit electrode operates in different states in the time-division manner. For example, the slit electrode and a plate electrode form a multi-dimensional electric field in the first period; and in the second period, a mutual capacitance is generated between the slit electrode, which serves as the drive electrode line, and the detection electrode line.

In order to prevent the adverse influence of an electrostatic charge on the display screen of ADS mode, an indium tin oxide (ITO) layer is electroplated between the base substrate of the color filter substrate and a polarizer sheet, and a conductive silver adhesive is coated on the edges of the color filter substrate. The ITO layer is electrically connected with the array substrate and a grounding pin of PCB by the conductive silver adhesive. In this way, when the external electrostatic charge comes into contact with the display screen, the electrostatic charge can be quickly grounded by the ITO layer, so that the electrostatic damage on the display screen caused by the electrostatic charge can be avoided.

However, the process of electroplating the ITO layer has high cost and complex procedure, which directly result in high manufacture cost and low production efficiency of the touch display screen.

SUMMARY OF THE INVENTION

An embodiment of the invention provides a touch display screen. The touch display screen comprises: an array substrate and a color filter substrate opposite to each other; a group of first electrode lines and a group of second electrode lines provided on the color filter substrate, wherein the first electrode lines are insulated from and intersect with the second electrode lines; and a group of first ground lines and/or a group of second ground lines provided on the color filter substrate, wherein the first ground lines are insulated from and intersect with the second ground lines.

An embodiment of the invention further provides a touch display device. The touch display device comprises the above touch display screen.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The embodiments of the invention provide a touch display screen and a touch display device, which can greatly reduce the manufacture cost of the touch display screen and increase production efficiency of the touch display screen while can achieve the electrostatic shield of the touch display screen.

Figure 1:
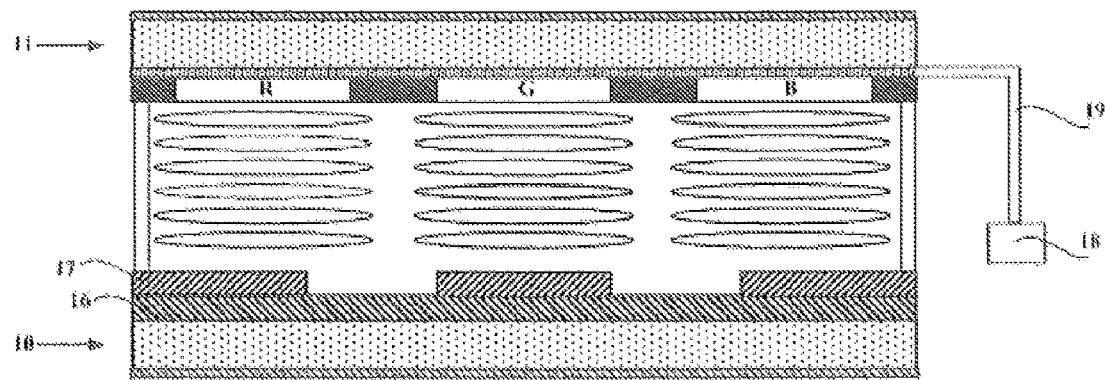
FIG. 1 is a schematic sectional view illustrating a touch display screen according to an embodiment of the invention.
Figure 2:
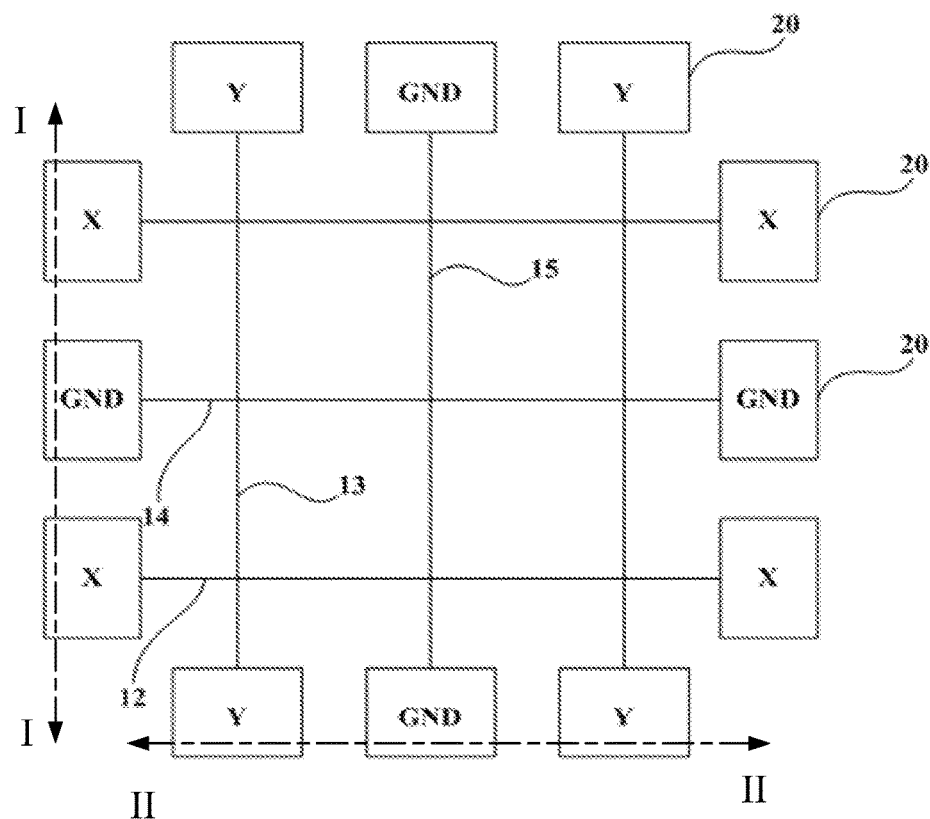
FIG. 2 is a schematic top view illustrating the touch display screen according to the embodiment of the invention.

FIG. 1 is a schematic sectional view illustrating a touch display screen according to an embodiment of the invention, and FIG. 2 is a schematic top view illustrating the touch display screen according to the embodiment of the invention. As shown in FIG. 1 and FIG. 2, the touch display screen according to the embodiment of the invention comprises: an array substrate 10 and a color filter substrate 11 opposite to each other; a group of first electrode lines 12 and a group of second electrode lines 13 provided on the color filter substrate 11, wherein the first electrode lines 12 are insulated from and intersect with the second electrode lines 13; and a group of first ground lines 14 and/or a group of second ground lines 15 provided on the color filter substrate 11, wherein the first ground lines 14 are insulated from and intersect with the second ground lines 15.

In one example, each of the first electrode lines 12 and each of the first ground lines 14 extend along a first direction; each of the second ground lines 15 and each of the second electrode lines 13 extend along a second direction intersecting with the first direction. In another example, each of the first electrode lines 12 and each of the second ground lines 15 extend along the first direction; and each of the second electrode lines 13 and each of the first ground lines 14 extend along the second direction intersecting with the first direction. For convenience, the following description is given in the case that each of the first electrode lines 12 and each of the first ground lines 14 extend along the first direction and each of the second electrode lines 13 and each of the second ground lines 15 extend along the second direction intersecting with the first direction.

It should be noted that, merely the first ground lines may be provided on the color filter substrate 11; or both the first ground lines and the second ground line, which are insulated from and intersect with each other, may be provided on the color filter substrate 11. Both of the above designs can achieve the electrostatic shield for the touch display screen. The layer in which the first ground lines 14 are provided and the layer in which the second ground line 15 are provided on the color filter substrate are not limited here. For example, the first ground lines 14 may be provided above or below the layer of the first electrode lines 12 or may be provided in the same layer with the first electrode lines 12. For example, the second ground lines 15 may be provided above or below the layer of the second electrode lines 13 or may be provided in the same layer with the second electrode lines 13.

In order not to affect the touch effect, each of the first ground lines 14 is provided between two adjacent first electrode lines 12 when the first ground lines 14 and the first electrode lines 12 are provided in the same layer, and an orthographic projection of each of the first ground lines 14 on the layer of the first electrode lines 12 is provided between two adjacent first electrode lines 12 when the first ground lines 14 and the first electrode lines 12 are provided in different layers.

When the second ground lines 15 and the second electrode lines 13 are provided in the same layer, each of the second ground lines 15 is provided between two adjacent second electrode lines 13. When the second ground lines 15 and the second electrode lines 13 are provided in different layers, an orthographic projection of each of the second ground lines 15 on the layer of the second electrode lines 13 is provided between two adjacent second electrode lines 13.

In order to achieve the touch function, the first electrode lines 12 may be used as drive electrode lines and the second electrode lines 13 may be used as detection electrode lines; or, the first electrode line 12 may be used as the detection electrode lines and the second electrode lines 13 may be used as the drive electrode lines.

In the touch display screen according to the embodiment of the invention, when the external electrostatic charge comes into contact with the touch display screen, the first ground lines 14 and/or the second ground lines 15 can output the electrostatic charge quickly to the ground to avoid the electrostatic damage on the touch display screen caused by the electrostatic charge. In addition, the first ground lines 14 and the second ground lines 15 also can prevent signal interference between two adjacent electrode lines. Compared with the conventional technology, the touch display screen according to the embodiment of the invention does not need to form an ITO layer by an electroplating process, which can greatly reduce the manufacture cost of the touch display screen and increases the production efficiency of the touch display screen while can achieve the electrostatic shield of the touch display screen.

The touch display screen according to the embodiment of the invention may be of IPS (In-Plane Switching) mode, ADS mode, etc. When the touch display screen according to the embodiment of the invention is of the ADS mode, the array substrate 10 comprises a plate electrode 16 and a slit electrode 17 provided above the plate electrode 16 and provided with a plurality of strip electrodes.

The first electrode lines, the second electrode lines, the first ground lines and the second ground lines on the color filter substrate 11 may carry out their respective electrical signal transmission in the following manners. Referring to FIG. 1, the touch display screen further comprises an IC (Integrated Circuit) module 18 with a ground unit and an FPC 19 (Flexible Printed Circuit, FPC for short), and the FPC 19 is in signal connection with the IC module 18. Each of the first electrode lines, each of the second electrode lines, each of the first ground lines and each of the second ground lines are in signal connection with the FPC 19 respectively. The IC module 18 is provided with the ground unit to output the electrostatic charge to the ground timely. The above connection manner has simple structure and the electrical signals can be reliably transmitted. When the external electrostatic charge comes into contact with the touch display screen, the first ground lines and/or the second ground lines can quickly output the electrostatic charge to the ground through the FPC 19 and IC module 18 to avoid the electrostatic damage on the touch display screen caused by the electrostatic charge.

Figure 3:
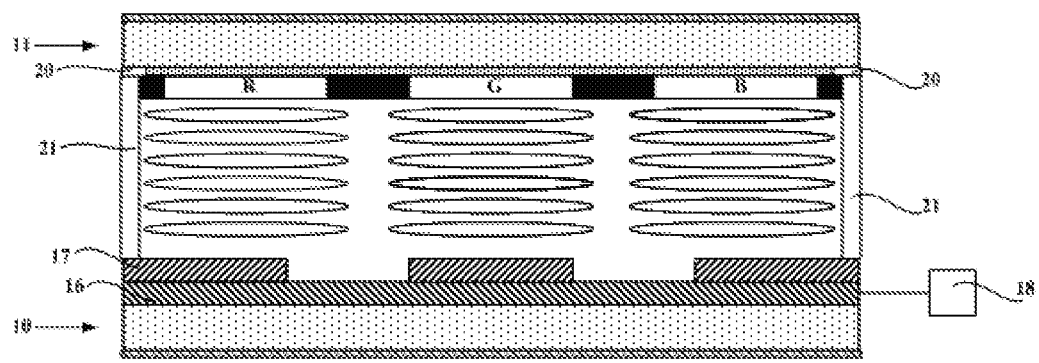
FIG. 3 is a schematic sectional view illustrating another touch display screen according to an embodiment of the invention.

In addition, the first electrode lines 12, the second electrode lines 13, the first ground lines 14 and the second ground lines 15 on the color filter substrate 11 may carry out their respective electrical signal transmission in the following manners. Referring to FIG. 2 and FIG. 3, in a periphery of the color filter substrate 11, one end or two ends of each first electrode line 12, each second electrode line 13, each first ground line 14 and each second ground line are provided with a conductive connection pin 20, the conductive connection pin 20 is in signal connection with the array substrate 10 by a conductive metallic ball (not shown) or a conductive sealant 21. In this case, the touch display screen further comprises an IC module 18 in signal connection with the array substrate 10 and provided with a ground unit.

For example, the conductive connection pin 20 may be a metallic connection pin and have a large area, so that the first ground lines 14 and the second ground lines 15 can transfer the electrostatic charge to the conductive metallic ball or the conductive sealant 21 quickly and further output the electrostatic charge to the ground through the array substrate 10 and the ground unit of the IC module 18.

Figure 4:
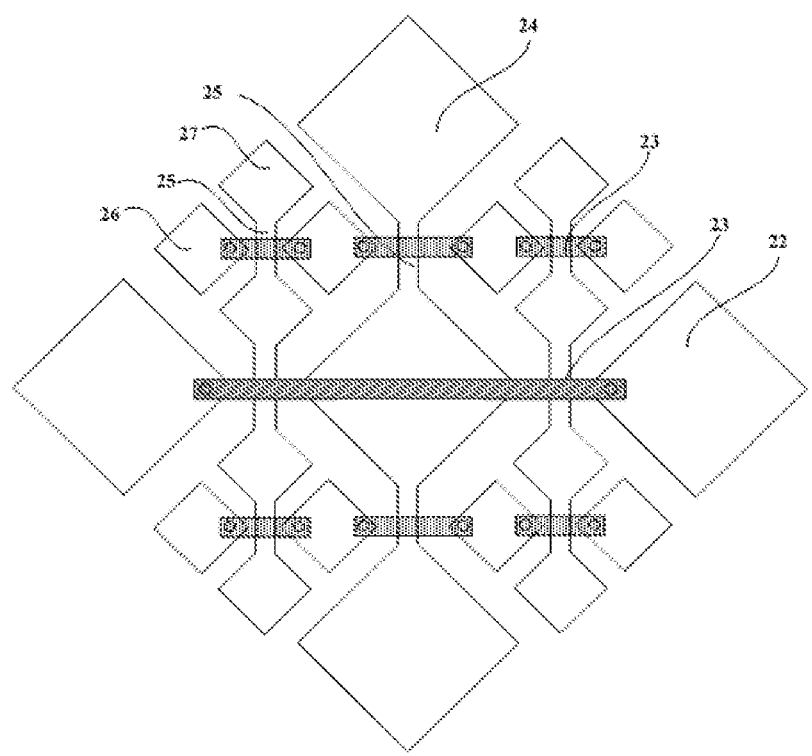
FIG. 4 is a schematic top view illustrating still another touch display screen according to an embodiment of the invention.
Figure 5A:
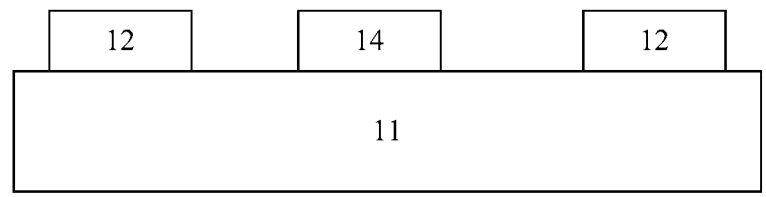
FIG. 5a is a cross sectional view which is taken along line I-I of FIG. 2 in the case that the first ground lines 14 and the first electrode lines 12 are provided in a same layer according to an embodiment as disclosed herein.
Figure 5B:
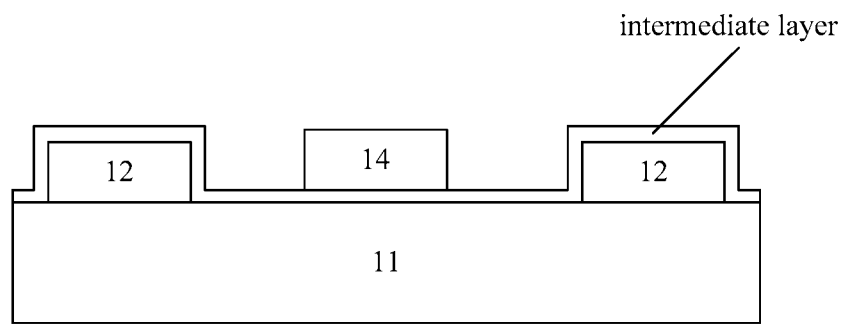
FIG. 5b is a cross sectional view which is taken along line I-I of FIG. 2 in the case that the first ground lines 14 and the first electrode lines 12 are provided in different layers and the first ground lines 14 are provided above the first electrode lines 12 according to an embodiment as disclosed herein.
Figure 5C:
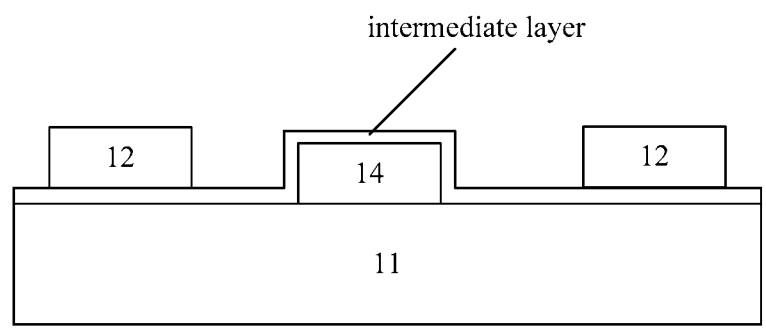
FIG. 5c is a cross sectional view which is taken along line I-I of FIG. 2 in the case that the first ground lines 14 and the first electrode lines 12 are provided in different layers and the first electrode lines 12 are provided above the first ground lines 14 according to an embodiment as disclosed herein.
Figure 6A:
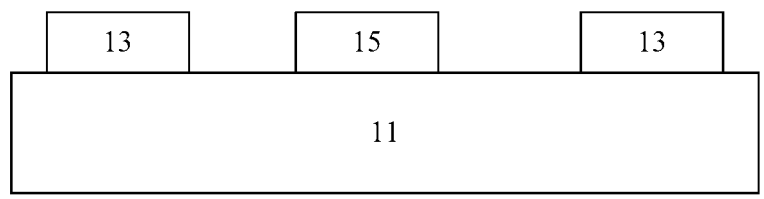
FIG. 6a is a cross sectional view which is taken along line II-II of FIG. 2 in the case that the second ground lines 15 and the second electrode lines 13 are provided in a same layer according to an embodiment as disclosed herein.
Figure 6B:
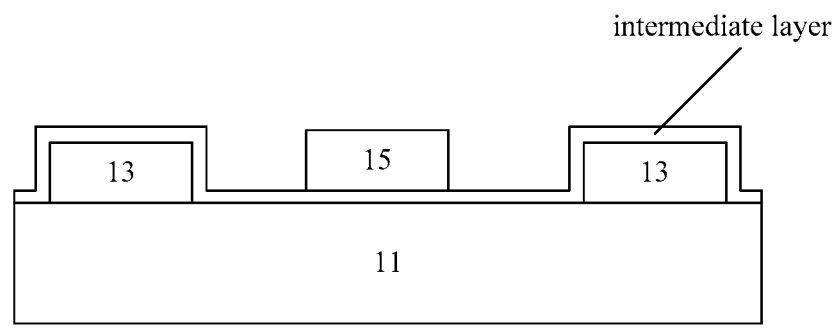
FIG. 6b is a cross sectional view which is taken along line II-II of FIG. 2 in the case that the second ground lines 15 and the second electrode lines 13 are provided in different layers and the second ground lines 15 are provided above the second electrode lines 13 according to an embodiment as disclosed herein.
Figure 6C:
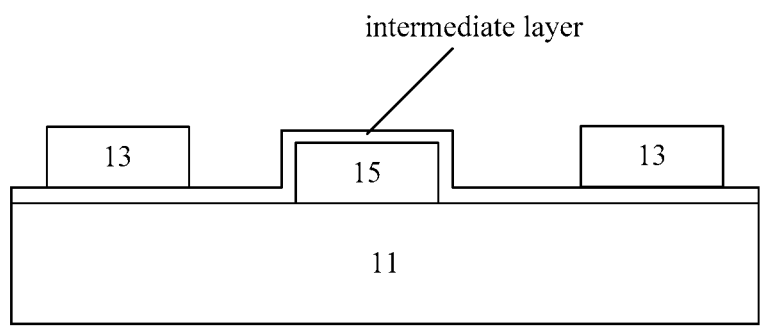
FIG. 6c is a cross sectional view which is taken along line II-II of FIG. 2 in the case that the second ground lines 15 and the second electrode lines 13 are provided in different layers and the second electrode lines 13 are provided above the second ground lines 15 according to an embodiment as disclosed herein.
Figure 7:
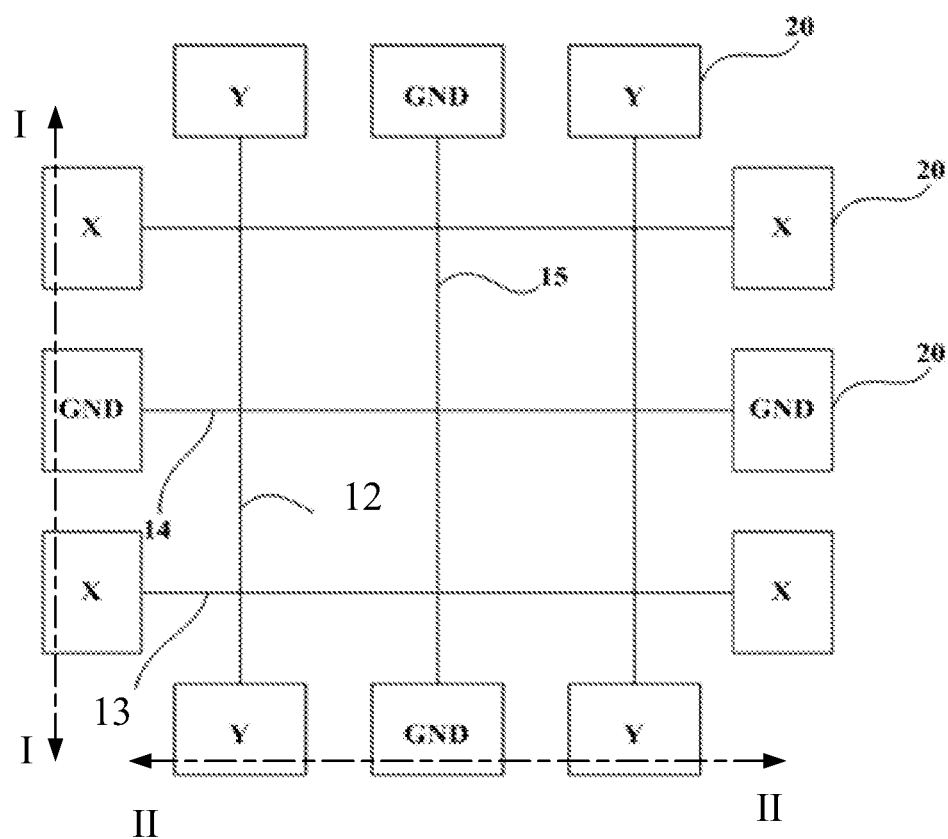
FIG. 7 is a schematic top view illustrating the touch display screen according to an embodiment as disclosed herein in which the second ground lines 15 are parallel to the first electrode lines 12 and the first ground lines 14 are parallel to the second electrode lines 13.
Figure 8A:
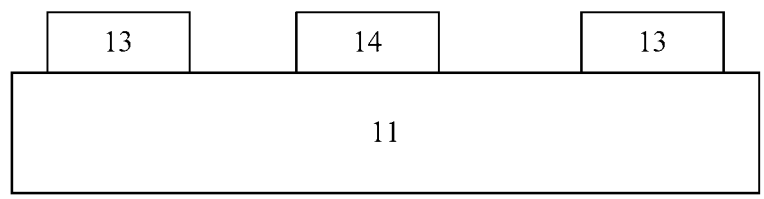
FIG. 8a is a cross sectional view taken along line I-I of FIG. 7 in the case that the first ground lines 14 and the second electrode lines 13 are provided in a same layer according to an embodiment as disclosed herein.
Figure 8B:
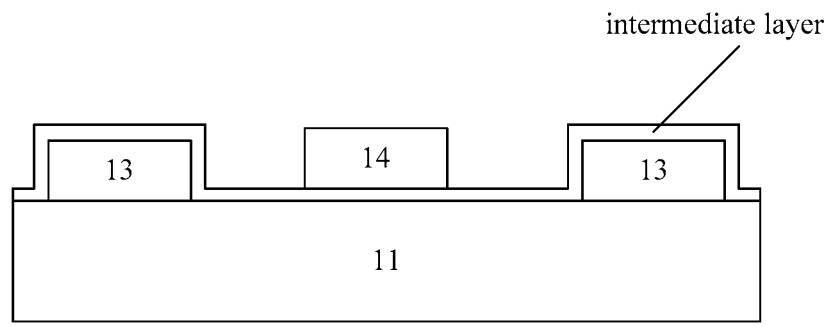
FIG. 8b is a cross sectional view taken along line I-I of FIG. 7 in the case that the first ground lines 14 and the second electrode lines 13 are provided in different layers and the first ground lines 14 are provided above the second electrode lines 13 according to an embodiment as disclosed herein.
Figure 8C:
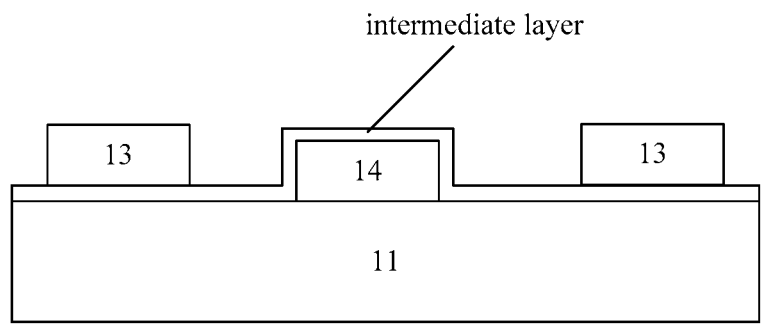
FIG. 8c is a cross sectional view taken along line I-I of FIG. 7 in the case that the first ground lines 14 and the second electrode lines 13 are provided in different layers and the second electrode lines 13 are provided above the first ground lines 14 according to an embodiment as disclosed herein.
Figure 9A:
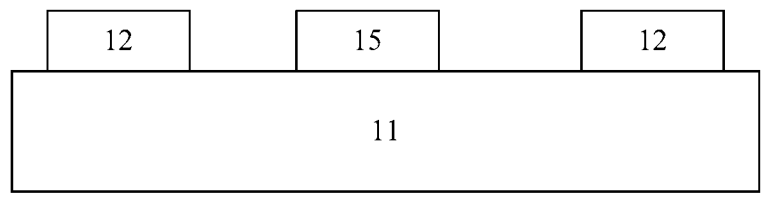
FIG. 9a is a cross sectional view taken along line II-II of FIG. 7 in the case that the second ground lines 15 and the first electrode lines 12 are provided in a same layer according to an embodiment as disclosed herein.
Figure 9B:
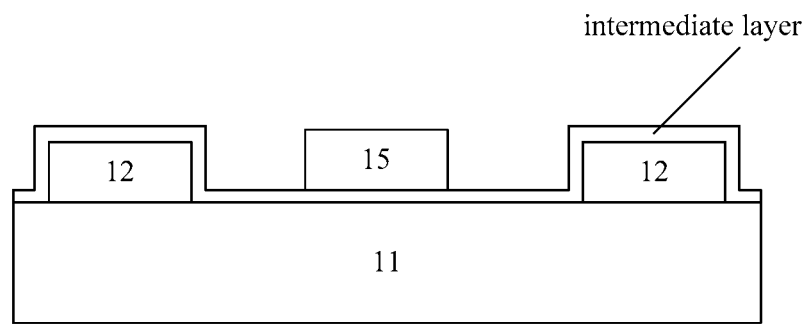
FIG. 9b is a cross sectional view taken along line II-II of FIG. 7 in the case that the second ground lines 15 and the first electrode lines 12 are provided in different layers and the second ground lines 15 are provided above the first electrode lines 12 according to an embodiment as disclosed herein.
Figure 9C:
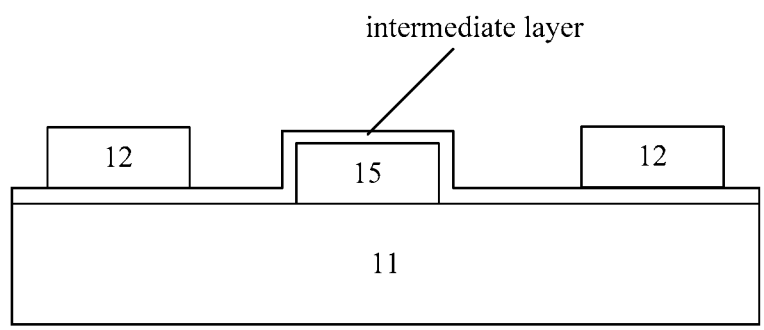
FIG. 9c is a cross sectional view taken along line II-II of FIG. 7 in the case that the second ground lines 15 and the first electrode lines 12 are provided in different layers and the first electrode lines 12 are provided above the second ground lines 15 according to an embodiment as disclosed herein.

The first electrode lines 12, the second electrode lines 13, the first ground lines 14 and the second ground lines 15 may be designed to have various forms, which are not limited here. For example, as shown in FIG. 4, in still another touch display screen according to an embodiment of the invention, each of the first electrode lines 12 includes: a plurality of first transparent electrode blocks 22 and a plurality of metallic bridges 23 for connecting adjacent first transparent electrode blocks 22 through via holes (or a plurality of transparent conductive connection lines for connecting adjacent first transparent electrode blocks 22); each of the second electrode line 13 includes: a plurality of second transparent electrode blocks 24 and a plurality of transparent conductive connection lines 25 for connecting adjacent second transparent electrode blocks 24 (or a plurality of metallic bridges for connecting adjacent second transparent electrode blocks 24 through via holes); each of the first ground line 14 includes: a plurality of first transparent ground blocks 26 and a plurality of metallic bridges 23 for connecting adjacent first transparent ground blocks 26 through via holes (or a plurality of transparent conductive connection lines for connecting adjacent first transparent ground blocks 26); each of the second ground line 15 includes: a plurality of second transparent ground blocks 27 and a plurality of transparent conductive connection lines 25 for connecting adjacent second transparent ground blocks 27 (or a plurality of metallic bridges for connecting adjacent second transparent ground blocks 27 through via holes).

For example, the first electrode lines 12 are used as the drive electrode lines, and the second electrode lines 13 are used as the detection electrode lines. The layer in which the first electrode lines 12 are provided, the layer in which the second electrode lines 13 are provided, the layer in which the first ground lines 14 are provided and the layer in which the second ground lines 15 are provided on the color filter substrate are not limited. Each of the first transparent electrode blocks 22 and each of the second transparent electrode blocks 24 are of large rhombic block or in any other shapes, and each of the first transparent ground blocks 26 and each of the second transparent ground blocks 27 are of small rhombic block or in any other shapes. Four cross-arranged small rhombic blocks (or four cross-arranged small blocks of any other shapes) are provided in each unit defined by the first electrode lines 12 and the second electrode lines 13 intersecting with each other. The first transparent electrode blocks 22, the second transparent electrode blocks 24, the first transparent ground blocks 26, the second transparent ground blocks 27 and the transparent conductive connection lines 25 may be made of indium tin oxide and the like and may be formed in a same patterning process. The metallic bridges 23 may be formed in another same patterning process.

An embodiment of the invention further provides a touch display device, which comprises the above-described touch display screen. In addition, the touch display device further comprises other components, such as a backlight, etc. Without forming the ITO layer or other similar transparent conductive layer, the touch display device according to the embodiment of the invention can greatly reduce the manufacture cost and increase the production efficiency while can achieve the electrostatic shield.

The foregoing embodiments merely are exemplary embodiments of the invention, and not intended to define the scope of the invention, and the scope of the invention is determined by the appended claims.

What is claimed is:

1. A touch display screen, comprising:
 an array substrate and a color filter substrate opposite to each other;

a group of first electrode lines and a group of second electrode lines, provided on the color filter substrate, wherein the first electrode lines are insulated from the second electrode lines, and the first electrode lines extend across the second electrode lines; and a group of first ground lines and a group of second ground lines, provided on the color filter substrate, wherein the first ground lines are insulated from the second ground lines, and the first ground lines extend across the second ground lines, wherein each of the first ground lines includes a plurality of first transparent rhombic ground blocks connected with each other, each of the second ground lines includes a plurality of second transparent rhombic ground blocks connected with each other, and four cross-arranged small rhombic blocks are provided in each unit defined by the first electrode lines and the second electrode lines intersecting with each other.

2. The touch display screen of claim 1, wherein each of the first ground lines and each of the first electrode lines extend along a first direction, each of the first ground lines is provided between two directly adjacent first electrode lines in the case that the first ground lines and the first electrode lines are provided in a same layer, and an orthographic projection of each of the first ground lines on a plane in which the first electrode lines are provided is provided between two directly adjacent first electrode lines in the case that the first ground lines and the first electrode lines are provided in different layers; and each of the second ground lines and each of the second electrode lines extend along a second direction intersecting with the first direction, each of the second ground lines is provided between two directly adjacent second electrode lines in the case that the second ground lines and the second electrode lines are provided in a same layer, and an orthographic projection of each of the second ground lines on a plane in which the second electrode lines are provided is provided between two directly adjacent second electrode lines in the case that the second ground lines and the second electrode lines are provided in different layers.

3. The touch display screen of claim 2, wherein the touch display screen further comprises an IC module with a ground unit and a flexible printed circuit;

the flexible printed circuit is in signal connection with the IC module; and each of the first electrode lines, each of the second electrode lines, each of the first ground lines and each of the second ground lines are in signal connection with the flexible printed circuit.

4. The touch display screen of claim 2, wherein in a periphery of the color filter substrate, one end or two ends of each first electrode line, each second electrode line, each first ground line and each second ground line are provided with a conductive connection pin, the conductive connection pin is in signal connection with the array substrate by a conductive metallic ball or a conductive sealant; and the touch display screen further comprises an IC module in signal connection with the array substrate and provided with a ground unit.

5. The touch display screen of claim 2, wherein the first electrode lines are used as drive electrode lines, and the second electrode lines are used as detection electrode lines; or the first electrode lines are used as detection electrode lines, and the second electrode lines are used as drive electrode lines.

6. The touch display screen of claim 2, wherein each of the first electrode lines includes: a plurality of first transparent electrode blocks, and a plurality of metallic bridges or a plurality of transparent conductive connection lines for connecting adjacent first transparent electrode blocks;

each of the second electrode lines includes: a plurality of second transparent electrode blocks, and a plurality of transparent conductive connection lines or a plurality of metallic bridges for connecting adjacent second transparent electrode blocks;

each of the first ground lines includes: the plurality of first transparent rhombic ground blocks, and a plurality of metallic bridges or a plurality of transparent conductive connection lines for connecting adjacent first transparent rhombic ground blocks; and each of the second ground lines includes: the plurality of second transparent rhombic ground blocks, and a plurality of transparent conductive connection lines or a plurality of metallic bridges for connecting adjacent second transparent rhombic ground blocks.

7. The touch display screen of claim 2, wherein the touch display screen is of an advanced super dimension switch mode; and the array substrate includes a plate electrode and a slit electrode provided above the plate electrode and provided with a plurality of strip electrodes.

8. The touch display screen of claim 1, wherein each of the first ground lines and each of the second electrode lines extend along a first direction, each of the first ground lines is provided between two directly adjacent second electrode lines in the case that the first ground lines and the second electrode lines are provided in a same layer, and an orthographic projection of each of the first ground lines on a plane in which the second electrode lines are provided is provided between two directly adjacent second electrode lines in the case that the first ground lines and the second electrode lines are provided in different layers; and each of the second ground lines and each of the first electrode lines extend along a second direction intersecting with the first direction, each of the second ground lines is provided between two directly adjacent first electrode lines in the case that the second ground lines and the first electrode lines are provided in a same layer, and an orthographic projection of each of the second ground lines on a plane in which the first electrode lines are provided is provided between two directly adjacent first electrode lines when the second ground lines and the first electrode lines are provided in different layers.

9. The touch display screen of claim 8, wherein the touch display screen further comprises an IC module with a ground unit and a flexible printed circuit;

the flexible printed circuit is in signal connection with the IC module; and each of the first electrode lines, each of the second electrode lines, each of the first ground lines and each of the second ground lines are in signal connection with the flexible printed circuit.

10. The touch display screen of claim 8, wherein in a periphery of the color filter substrate, one end or two ends of each first electrode line, each second electrode line, each first ground line and each second ground line are provided with a conductive connection pin, the conductive connection pin is in signal connection with the array substrate by a conductive metallic ball or a conductive sealant; and the touch display screen further comprises an IC module in signal connection with the array substrate and provided with a ground unit.

11. The touch display screen of claim 8, wherein the first electrode lines are used as drive electrode lines, and the second electrode lines are used as detection electrode lines; or the first electrode lines are used as detection electrode lines, and the second electrode lines are used as drive electrode lines.

12. The touch display screen according to claim 8, wherein each of the first electrode lines includes: a plurality of first transparent electrode blocks, and a plurality of metallic bridges or a plurality of transparent conductive connection lines for connecting adjacent first transparent electrode blocks;

each of the second electrode lines includes: a plurality of second transparent electrode blocks, and a plurality of transparent conductive connection lines or a plurality of metallic bridges for connecting adjacent second transparent electrode blocks;

each of the first ground lines includes: the plurality of first transparent rhombic ground blocks, and a plurality of metallic bridges or a plurality of transparent conductive connection lines for connecting adjacent first transparent rhombic ground blocks; and each of the second ground lines includes: the plurality of second transparent rhombic ground blocks, and a plurality of transparent conductive connection lines or a plurality of metallic bridges for connecting adjacent second transparent rhombic ground blocks.

13. The touch display screen of claim 8, wherein the touch display screen is of an advanced super dimension switch mode; and the array substrate includes a plate electrode and a slit electrode provided above the plate electrode and provided with a plurality of strip electrodes.

14. The touch display screen of claim 1, wherein the touch display screen further comprises an IC module with a ground unit and a flexible printed circuit;

the flexible printed circuit is in signal connection with the IC module; and each of the first electrode lines, each of the second electrode lines, each of the first ground lines and each of the second ground lines are in signal connection with the flexible printed circuit.

15. The touch display screen of claim 1, wherein in a periphery of the color filter substrate, one end or two ends of each first electrode line, each second electrode line, each first ground line and each second ground line are provided with a conductive connection pin, the conductive connection pin is in signal connection with the array substrate by a conductive metallic ball or a conductive sealant; and the touch display screen further comprises an IC module in signal connection with the array substrate and provided with a ground unit.

16. The touch display screen of claim 1, wherein the first electrode lines are used as drive electrode lines, and the second electrode lines are used as detection electrode lines; or the first electrode lines are used as detection electrode lines, and the second electrode lines are used as drive electrode lines.

17. The touch display screen of claim 1, wherein each of the first electrode lines includes: a plurality of first transparent electrode blocks, and a plurality of metallic bridges or a plurality of transparent conductive connection lines for connecting adjacent first transparent electrode blocks;

each of the second electrode lines includes: a plurality of second transparent electrode blocks, and a plurality of transparent conductive connection lines or a plurality of metallic bridges for connecting adjacent second transparent electrode blocks;

each of the first ground lines includes: the plurality of first transparent rhombic ground blocks, and a plurality of metallic bridges or a plurality of transparent conductive connection lines for connecting adjacent first transparent rhombic ground blocks; and each of the second ground lines includes: the plurality of second transparent rhombic ground blocks, and a plurality of transparent conductive connection lines or a plurality of metallic bridges for connecting adjacent second transparent rhombic ground blocks.

18. The touch display screen of claim 1, wherein the touch display screen is of an advanced super dimension switch mode; and the array substrate includes a plate electrode and a slit electrode provided above the plate electrode and provided with a plurality of strip electrodes.

19. A touch display device, comprising the touch display screen of claim 1.

* * * * *